United States Patent [19]
Kunsman

[11] Patent Number: 5,833,214
[45] Date of Patent: *Nov. 10, 1998

[54] PLUG VALVE WITH ADJUSTABLE DISC

[75] Inventor: Donald R. Kunsman, Bethlehem, Pa.

[73] Assignee: Victaulic Company of America, Easton, Pa.

[*] Notice: This patent issued on a continued prosecution application filed under 37 CFR 1.53(d), and is subject to the twenty year patent term provisions of 35 U.S.C. 154(a)(2).

[21] Appl. No.: 664,289

[22] Filed: Jun. 11, 1996

[51] Int. Cl.$^6$ .................................................. F16K 5/00
[52] U.S. Cl. .................................... 251/309; 251/86
[58] Field of Search ......................... 251/309, 317.1, 251/84, 86

[56] References Cited

U.S. PATENT DOCUMENTS

| | | | |
|---|---|---|---|
| 3,195,857 | 7/1965 | Shafer | 251/309 |
| 3,456,916 | 7/1969 | Ytzen et al. | 251/309 |
| 4,640,492 | 2/1987 | Carlson, Jr. | 251/309 X |
| 4,682,758 | 7/1987 | Scobie et al. | 251/84 |
| 5,305,985 | 4/1994 | Fendley et al. | 251/86 |

*Primary Examiner*—John Fox
*Attorney, Agent, or Firm*—Abelman, Frayne & Schwab

[57] ABSTRACT

A plug valve of the type including a valve disc supported by a yoke, includes adjustable members interposed between the yoke and the valve disc permitting adjustment of the valve disc relative to the yoke.

4 Claims, 5 Drawing Sheets

PLUG VALVE WITH ADJUSTABLE DISC

FIELD OF THE INVENTION

This invention relates to plug valves, and in particular relates to plug valves that incorporate a sealing disc, or dual sealing discs for respectively sealing an inlet and an outlet of a valve, for them to simulate the function of a ball valve.

BACKGROUND OF THE INVENTION

Plug valves having a sealing disc, are known in the art. An example of such a plug valve is illustrated in the accompanying drawings.

That plug valve includes a yoke member that is supported at its opposite ends by stub shafts, which are journaled for rotation about a fixed axis within a valve body.

The yoke member has a valve disc secured thereto, the valve disc being movable into seated relation with a valve seat upon rotation of the yoke about the fixed axis.

The valve disc attached to the yoke is rigidly attached thereto in such a manner that precludes any adjustment of the valve disc relative to the valve seat, which in turn, substantially increases the cost of manufacturing such a valve. If satisfactory sealing characteristics of the valve disc are to be maintained, this in turn, requires close tolerances in the manufacture of the entire structure, in order to insure that the valve disc is positionally held within very close manufacturing tolerances.

Additionally, the working pressures to be expected during use of the valve, and, the operational temperature to which the valve is to be subjected introduce further variables, which mandate a specific valve disc and yoke combination for any specific operational characteristics of the valve, thus negating the possibility of providing a plug valve that has universal application, regardless of the operational parameters that are to be expected.

SUMMARY OF THE INVENTION

The invention has for its object to provide a disc type plug valve that is adjustable, in order that an open-stock valve can be pre-adjusted for it to accommodate the expected operational parameters in use of the valve.

Adjustability of the disc type plug valve of the present invention, in turn results in a disc type plug valve in which the requirement for extremely fine manufacturing tolerances is eliminated, while at the same time providing a disc type plug valve that can be pre-adjusted in order to accommodate any one of a variety of operational parameters, thus to provide a disc type plug valve having applicability to a very wide range of operational parameters, this, in turn, greatly reducing the necessity to provide and warehouse a number of differing disc type of plug valves having specific predetermined characteristics.

A single construction of disc type plug valve can be manufactured, and, according to the expected operational parameters, can then be adjusted to meet the specific operational parameters. This can be done in an extremely simple manner, under operational conditions, with the option of the valve being pre-tested before incorporation of the valve into the intended hydraulic or pneumatic circuit.

In order to accomplish these objects, the disc of the plug valve is secured to the yoke by members that are adjustable, thus permitting adjustment and extremely accurate positioning of the valve disc relative to the cooperating valve seat.

The adjustment is provided by adjustable stop members carried by the valve yoke, and which engage that face of the valve disc that is presented towards the yoke, additional fastening members being provided for securing the valve disc to the yoke subsequent to the adjustment of the stop members relative to the valve disc.

Adjustment of the valve disc relative to the valve yoke permits testing of the valve under the expected operational conditions. Further, adjustment of the valve disc relative to the yoke can be employed to eliminate the effects of manufacturing tolerances that may have arisen in the manufacture of the valve. For example, in the event that the axis of the stub shafts supporting the yoke is not perfectly in parallel alignment with the plane of the valve seat, compensating adjustments can be made in the positioning of the valve disc, in order to negate the effects of such mis-alignment. Further, the seating pressure of the valve disc on the valve seat can be adjusted in order to accommodate the line pressure to be expected on the valve disc, the line pressures envisaged being in the order of 50 p.s.i. to 150 p.s.i. or more.

An additional advantage of the present invention is that it permits the provision of a valve disc that has been hand-coated with an elastomeric sealant material, as opposed to the molding of the sealant material onto the face of the valve disc. Such a molding operation must be effected under extremely fine tolerances. Without regard to whether the coating is effected by hand-coating or molding, according to the present invention any deviation in the thickness of the coating can be accommodated with ease at the point of testing of the valve assembly.

DESCRIPTION OF THE PREFERRED EMBODIMENTS

Preferred embodiments of the invention will now to discussed with reference to the accompanying drawings forming a part hereof, and in which.

DESCRIPTION OF THE RELATED ART

Figure 1:
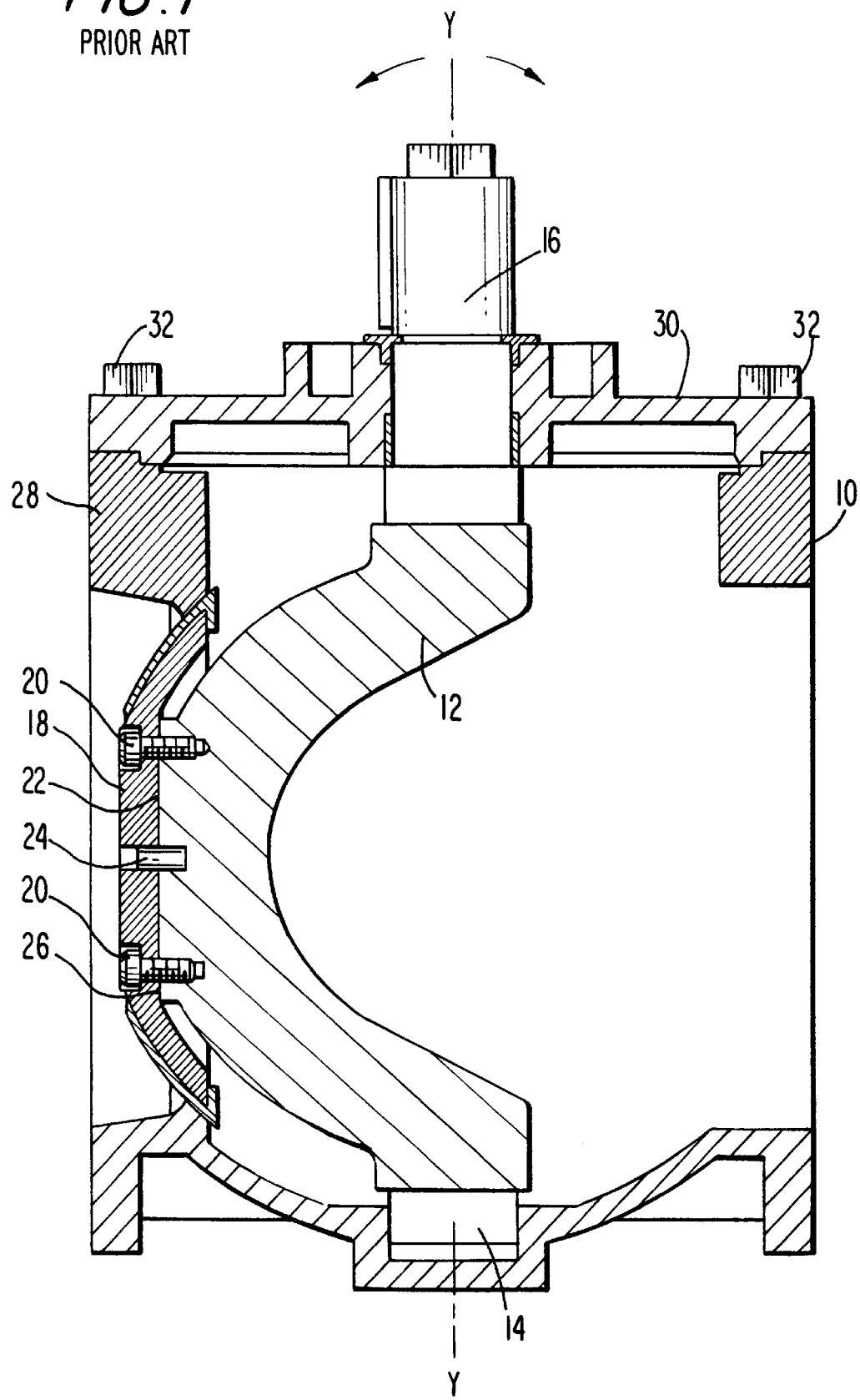
FIG. 1 is an illustration of a known form of plug valve employing a valve disc, the valve being shown in longitudinal cross-section.

Referring now to FIG. 1, the disc type plug valve known in the art includes a valve body 10, which contain a yoke 12 that is supported by a stub shaft 14 and operating shaft 16 for rotation within the valve body 10 about the axis Y—Y.

The yoke carries a valve disc 18, which is secured to the yoke 12 by securing screws 20, which draw a planar face of the valve disc 18 into closely seated engagement with a mating planar face 22 of the yoke. In order further to prevent misalignment of the valve disc 18 relative to the yoke 12, a key 24 is provided, the key 24 optionally being a post secured in the yoke 12 and extending into the valve disc 18.

The valve disc 18 is coated circumferentially with an elastomeric material to provide a valve disc coating 26 for cooperation with a valve seat 28 of the valve body 10.

To permit assembly of the valve, the operating shaft 16, of the valve yoke 12 first is passed through a closure plate 30, and, the yoke 12 is then passed into the interior of the valve body 10 to engage the stub shaft 14 with a seating provided by the valve body 10, subsequent to which the closure plate 30 is bolted down onto the valve body 10 using bolts 32.

The operating shaft 16 is then employed to rotate the yoke and the valve disc 18 about the Y—Y axis, for the valve disc 18 to be seated in sealing relation with the valve seat 28, or, for it to be removed from the valve seat 28 and permit flow through the valve body 10.

As will be apparent, the extent of sealing of the valve disc 18 on the valve seat 28, and the uniformity thereof peripherally of the valve disc 18, is entirely dependent on the axis of revolution Y—Y of the yoke 12 and its stub shaft 14 and operating shaft 16 being truly parallel to the operative face of the valve seat 28. However, in order to permit inspection of the valve disc 18 and its supporting yoke 12 into the valve body 10, an access port must be provided, and in turn the access port must be closed by the closure plate 30 and secured by bolts 32.

Unless extremely fine manufacturing tolerances are employed in the manufacture of the valve body 10, and in the manufacture of the closure plate 30, then, the axis of revolution of the yoke 12 will not be predictably truly coincident with Y—Y axis. If, however, there is any deviation from the Y—Y axis, this will result in uneven seating of the valve disc 18 on the valve seat 28, which in turn will result a lowering of the maximum pressure that can be accommodated by the valve. The maximum pressure is determined by the minimum point of pressure sealing of the valve disc 18 with the valve seat 28.

Further, extremely fine tolerances must be held in the manufacture of the yoke 12, and also, in the manufacture of the valve disc 18. Even in the event that extremely fine manufacturing tolerances are held in the manufacture of the valve assembly, the valve assembly is still subject to the vagaries of temperature changes.

In the event that the valve is to be operated at elevated temperatures, then, an elongation of the valve body 10 is to be expected, this reducing the seating pressure of the valve seat 28 with the valve disc 18. Further, the valve disc 18 will flex in dependence on temperature changes, and also, the yoke 12 will flex under temperature changes, each of these conditions being operative to change the seating pressure of the valve disc 18 on the valve seat 28.

Thus, the valve known in the art must be initially designed to function as intended at a selected pressure and a selected temperature, this requiring to the employment of extremely fine manufacturing tolerances, and in turn resulting in a valve construction having characteristics specific to its intended use, and in turn, requiring the manufacture and warehousing of different valves for specific uses.

DESCRIPTION OF PREFERRED
EMBODIMENTS OF THE INVENTION

Figure 2:
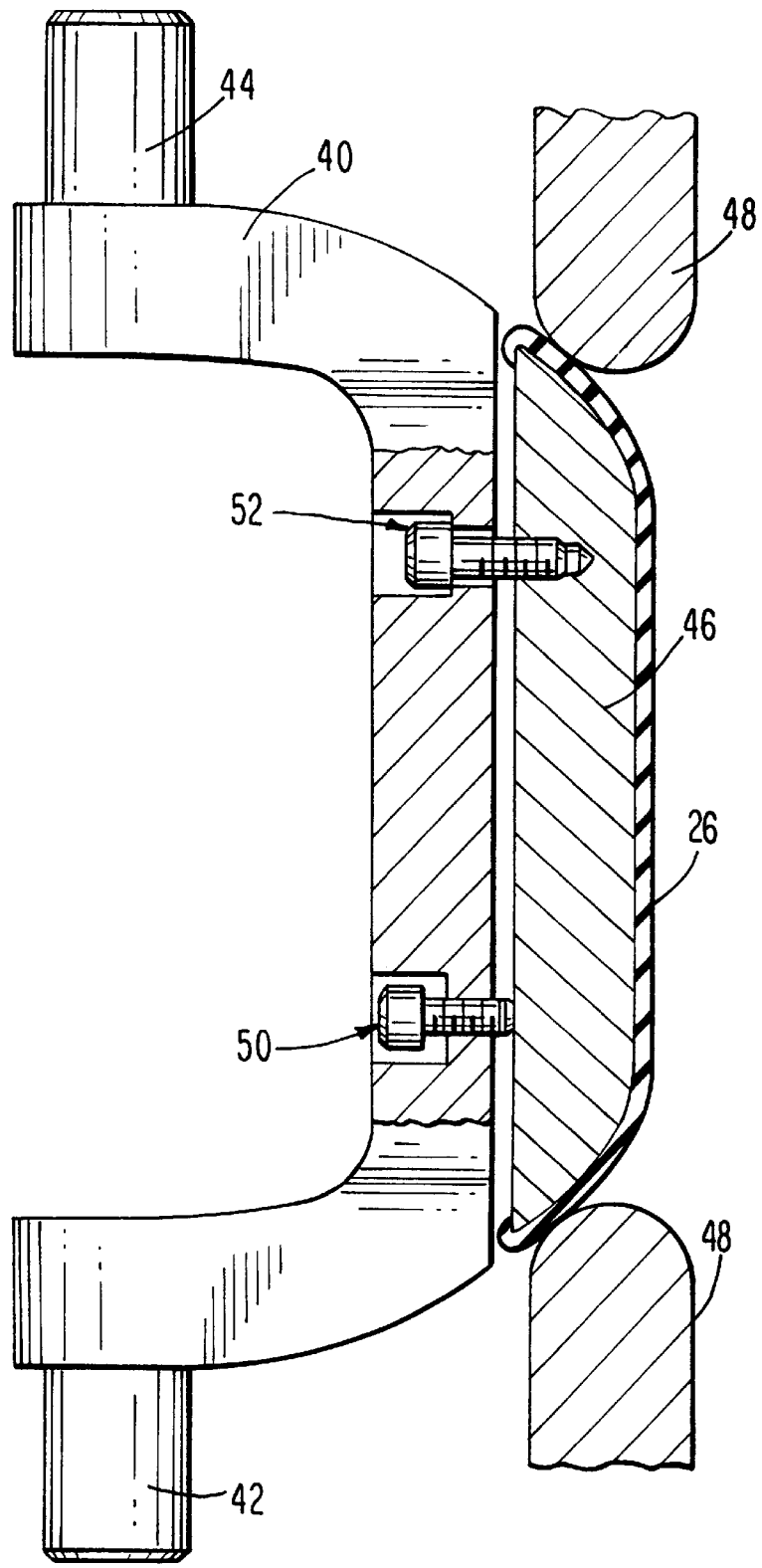
FIG. 2 is a view partially in cross-section of the valve yoke and adjustable valve disc of the present invention.

Referring now to FIG. 2, which illustrates a first preferred embodiment of the invention, a yoke 40 of the valve is provided with a stub shaft 42 and an operating shaft 44, which are to be received within the conventional valve body (not shown).

The yoke 40 supports a valve disc 46 for cooperation with a valve seat 48, the valve disc 46 being adjustably supported on the yoke 40 by means of grub screws or stop members 50 operative to space the valve disc 46 from the yoke 40, and, locating bolts 52 operative to secure the valve disc 46 to the yoke 40 in its final position of adjustment by the grub screws 50.

As is discussed later with respect to FIG. 5, multiple grub screws or stop members 50 are provided, and a corresponding number of locating bolts, which conveniently can be arranged in a circle concentric with the periphery of the valve disc.

The grub screws or stop members 50 are received in threaded bore in the yoke 40, and react against the rear face of the valve disc 46 in order to positionally adjust the valve disc 46 relative to the yoke 40.

The locating bolts 52 extend freely through the yoke 40, and are threaded into the valve disc 46, the locating bolts thus being operative to draw and lock the valve disc 46 into seated engagement with the grub screws 50.

An alternative construction (not illustrated) would be for the locating bolts 52 to be held within the yoke 40 against axial movement relative to the yoke, in which event the stop members or grub screws 50 would become redundant.

Having assembled a valve employing the structure illustrated in FIG. 2, then, the valve can be bench-calibrated under operational conditions. Hydraulic or pneumatic pressure can be applied against the operative face of the disc 46, and, the positional relationship of the valve disc 46 relative to the yoke 40 adjusted to insure that the valve disc is in correct seating relation with the valve seat 48. Any deviations from "exact" of any of the components of the valve, and, any deviations in manufacturing tolerances that may have developed in the manufacture and assembly of the valve can be compensated for in this manner. True parallelism of the valve disc 46 with the valve seat 48 can be attained, regardless of deviations of the yoke 40 from the Y—Y axis, and also regardless of deviations from "exact" that may have arisen in the manufacture of the yoke 40 itself and its associated stub shaft 42 and operating shaft 44. Also, any deviations in positioning the closure plate 30, which will result in off-setting of the Y—Y axis can be compensated for and their consequences eliminated.

A further advantage of the present invention is that, as there are no screws extending frontally through the valve disc entire frontal surface of the valve disc 46 can thus be coated with an elastomeric material. Further, any deviations that may occur in the thickness of the elastomeric coating of material, either in the manual application thereof, or in the molding thereof, readily can be compensated for by adjustment of the position of the valve disc 46.

Additionally, adjustment of the valve disc 46 can be made in order to accommodate the effects of elevated pressures, and, in the event that the valve body is heated to its working temperature, the parameters of operation of the valve can be calibrated at that operational temperature.

Adjustment of the positioning of the valve disc 46 readily can be effected through the open downstream port of the valve, by using an appropriate wrench or screw driver, the locating bolts 52 having been temporarily loosened to permit adjustment of the position of the valve disc 46 by the grub screws 50. The locating bolts 52 are then tightened down to immovably hold the valve disc 46 in its position of adjustment relative to the yoke 40.

Figure 3:
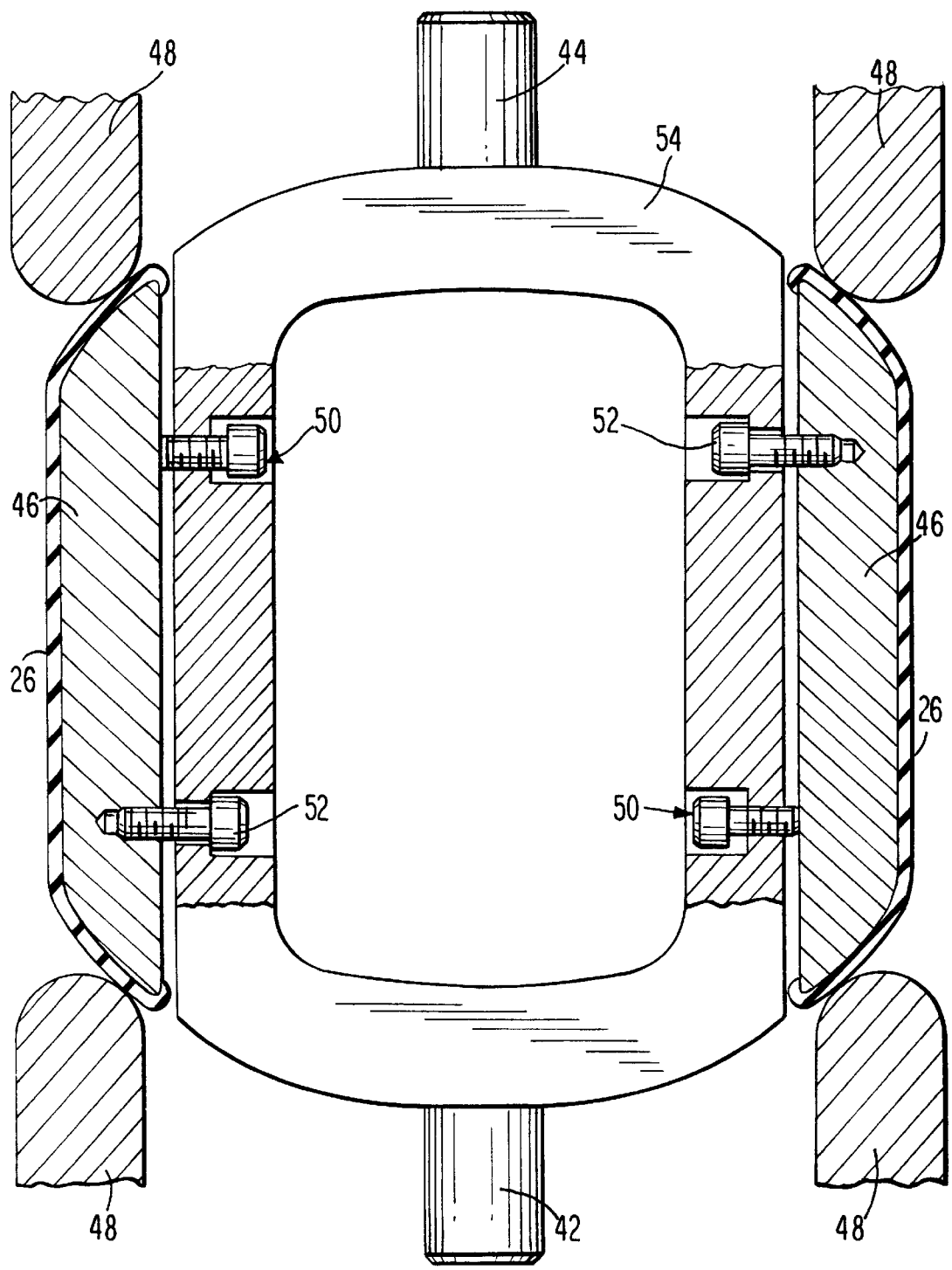
FIG. 3 is a side view, also partially in cross-section, of a dual yoke and adjustable valve disc construction according to the present invention simulating the construction of a ball valve.

If desired, the plug valve of FIG. 2 can be in the form of a ball valve, as illustrated in FIG. 3, in which identical reference numerals have been employed to indicate corresponding components of the structure, the sole difference being that the yoke 40 of FIG. 2 is formed as a double yoke 54 in FIG. 3.

Figure 4:
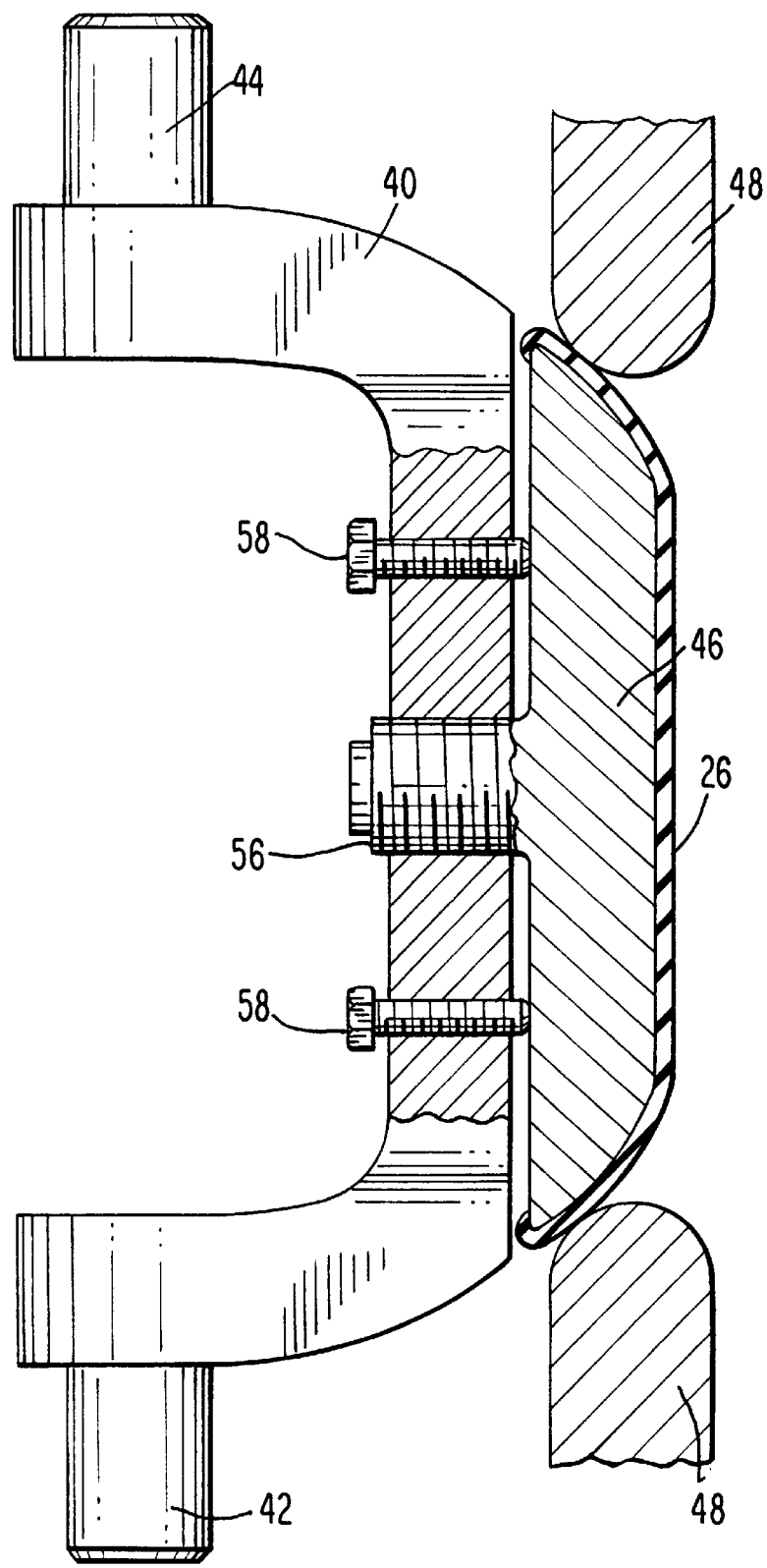
FIG. 4 is view corresponding with FIG. 2, but showing an alternative form of attachment of the adjustable valve, disc to the yoke of the valve, and, FIG. 5 is a side elevation of the yoke and the valve disc of the present invention.

As illustrated in FIG. 4, the stop members or grub screws 50 previously discussed can be replaced by central threaded member 56 that is threadedly received within a threaded bore of the yoke 40, the locating bolts then being provided by threaded bolts 58 received in threaded bolt holes in the yoke 40.

The loosening of the threaded bolts 58 then permits the valve disc 46 to be advanced or retracted by rotating the valve disc 46 by the central threaded member 56, subsequent to which the threaded bolts 58 are torqued down into engagement with the valve disc 46, to lock the valve disc in its adjusted position.

By permitting play between the threads of the central threaded member 56 and the corresponding threads of the yoke 40, the possibility still exists of moving the valve disc 46 angularly by a limited extent relative to the yoke 40.

Other configurations of stop members and locating bolts will suggest themselves to persons skilled in the part that satisfy the requirement for adjustment of the position of the valve disc 46 relative to the yoke 40.

Figure 5:
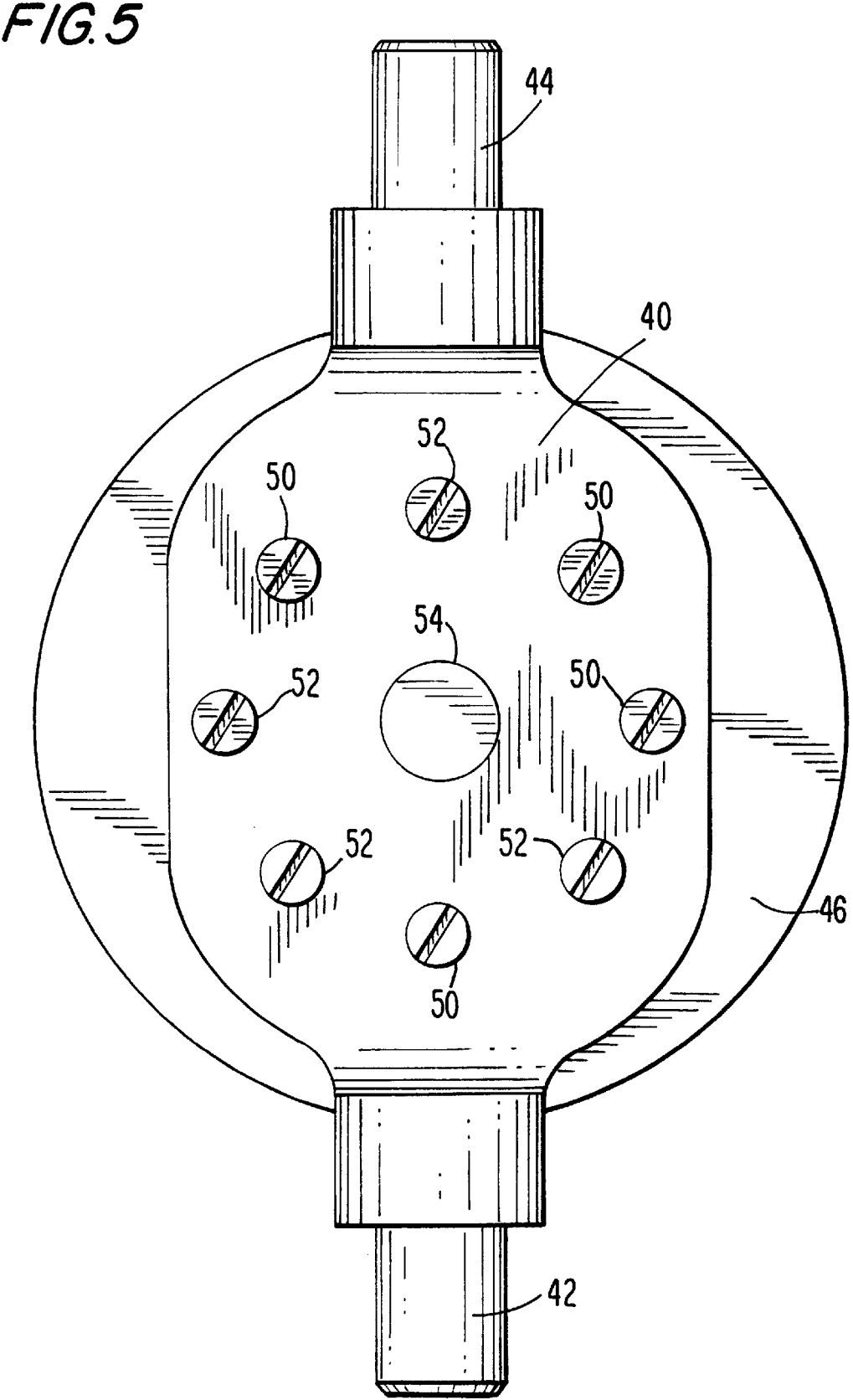

FIG. 5 illustrates a convenient manner in which the stop members or grub screws 50 and the locating bolts 52 of FIGS. 2 and 3 can be arranged, as can the centrally threaded member 56 of FIG. 4. Conveniently, the stop members of grub screws 50 and locating bolts 52 are arranged on the yoke 40 in an arrangement concentric with the periphery of the valve disc 46. The number of stop members or grub screws 50 must be at least three arranged in triangular configuration, while any number of locating bolts 52 can be employed arranged in any desired arrangement, preferably at least three locating bolts 52 arranged in triangular configuration, thus to ensure omni-directional adjustment of the valve disc 46 relative to the yoke 40.

The body of the valve forms no part of this invention, and, can be modified in any way necessary to meet specific requirements. For example, when employing a double yoke 54 such as is illustrated in FIG. 3, in order to permit adjustment of the respective valve discs 46, some form of lateral opening will need to be provided in the valve body 10 in order to permit access to the stop members or grub screws 50 and the locating bolts 52.

What is claimed is:
1. A plug valve including:
   a valve body;
   a valve seat provided on said valve body;
   a valve member rotatable within said valve body, said valve member including a yoke and a valve disc carried by said yoke, said valve member being operative to move said valve disc into seated relation with said valve seat of said valve body between an open and a closed position of said plug valve; and
   intermediate members interposed between said yoke and said valve disc adapted for adjustment and locking of said valve disc relative to said yoke;
   whereby the positional relationship of said valve disc relative to said valve seat can be adjusted and locked;
   said plug valve being such that said intermediate members include at least one adjustable stop member carried by said yoke and reacting against said valve disc, and locking members carried by said yoke operative to draw said valve disc into seated relation with said at least one adjustable stop member.

2. The plug valve of claim 1, in which said at least one adjustable stop member comprises grub screws threaded in said yoke and reacting against said valve disc, and said locking members comprise headed bolts extending through said yoke and threaded into said valve disc, said heads of said bolts reacting against said yoke to draw said valve disc into seated relation with said at least one adjustable stop member.

3. The plug valve of claim 1, in which said at least one adjustable stop member is operative to adjust the position of said valve disc relative to said yoke and said locking members are operative to maintain said valve disc in a fixed position of adjustment relative to said yoke.

4. The plug valve of claim 1, including two of said valve discs adjustably secured to said yoke on opposite sides of the center of rotation of said yoke, whereby to provide said plug valve in the form of a ball valve.

* * * * *